US011756041B2

(12) United States Patent
Efraim et al.

(10) Patent No.: US 11,756,041 B2
(45) Date of Patent: Sep. 12, 2023

(54) PROGRAMMATIC APPROVALS OF CORPORATE SPEND AND EMPLOYEE EXPENSE

(71) Applicant: Custodia Inc., New York, NY (US)

(72) Inventors: Elad Efraim, New York, NY (US); Jonathan Heller, Nirit (IL); James Hackett, Port Washington, NY (US)

(73) Assignee: Custodia Inc., New York, NY (US)

( * ) Notice: Subject to any disclaimer, the term of this patent is extended or adjusted under 35 U.S.C. 154(b) by 546 days.

(21) Appl. No.: 16/436,938

(22) Filed: Jun. 11, 2019

(65) Prior Publication Data

US 2019/0378136 A1 Dec. 12, 2019

Related U.S. Application Data

(60) Provisional application No. 62/683,114, filed on Jun. 11, 2018.

(51) Int. Cl.
*G06Q 20/40* (2012.01)
*G06N 20/00* (2019.01)
*G06Q 10/0631* (2023.01)

(52) U.S. Cl.
CPC .......... *G06Q 20/405* (2013.01); *G06N 20/00* (2019.01); *G06Q 10/06312* (2013.01)

(58) Field of Classification Search
None
See application file for complete search history.

(56) References Cited

U.S. PATENT DOCUMENTS

| 2008/0027860 | A1* | 1/2008 | Mullen | G06Q 20/40 705/39 |
| 2015/0081349 | A1* | 3/2015 | Johndrow | G06Q 20/405 705/5 |
| 2016/0117650 | A1* | 4/2016 | Weidenmiller | G06Q 20/405 705/44 |
| 2017/0011399 | A1* | 1/2017 | Steinlicht | G06Q 20/3263 |

* cited by examiner

*Primary Examiner* — Jamie R Kucab (57) ABSTRACT

A method of approving expenditures in real-time, comprising receiving an expenditure request initiated by a user associated with an organization for transferring funds of the organization in exchange for one or more products and/or services, identifying request attribute(s) relating to the user, the value, the funds, the product, the service, a time of reception of the expenditure request and/or a geographical location of the user, analyzing scheduling data obtained from one or more online data sources which is indicative of one or more activity attributes of activity(s) scheduled for the user, automatically determining compliance between the request attribute(s) and one or more expenditure rules predefined for the product(s) and/or service(s) with respect to the activity attribute(s) and transmitting a response to the expenditure request according to the determination which includes approval of the expenditure request in case of compliance and rejection in case of incompliance.

11 Claims, 3 Drawing Sheets

PROGRAMMATIC APPROVALS OF CORPORATE SPEND AND EMPLOYEE EXPENSE

RELATED APPLICATION(S)

This application claims the benefit of priority under 35 USC § 119(e) of U.S. Provisional Patent Application No. 62/683,114, filed on Jun. 11, 2018, the contents of which are incorporated by reference as if fully set forth herein in their entirety.

FIELD AND BACKGROUND OF THE INVENTION

The present invention, in some embodiments thereof, relates to approving expenditures, automatically in real-time, for users associated with an organization, and, more specifically, but not exclusively, to approving expenditures, in real-time, for users associated with an organization based on analysis of scheduling information indicative of activities scheduled for the user and compliance of the expenditures with predefined expenditure rules and/or learned approval patterns doe the identified scheduled activities.

In order to maintain their day to day operation, most organizations, in particular large organizations, for example, companies, enterprises, government agencies and offices, education institutes, medical institutes and/or the like need to trust payment means of the organization in the hands of individuals associated with the organization, for example, employees, contractors, customers and/or the like.

Financial transactions in modern times have long past been mainly done using digitally based transaction instructions for transferring funds, in particular monetary funds and replacing the traditional actual (cash) money transactions. The majority of the digital funds transaction is done using digital cards, for example, a credit card, a debit card, digital wallet and/or the like. However, in recent years the introduction of blockchain based cryptocurrencies has paved the way for further usage of digital currency, in fact a virtual currency that is not regulated by any one single entity, such as states, central banks and/or the like.

As such the payment means provided by the organizations to the individuals may include digital cards and/or access to cryptocurrency accounts. However, trusting organization funds in the hands of the individuals may expose the organization to major vulnerabilities and possible damage due to intentional embezzlement of the organization funds by the individuals and/or due to unintentional or careless handling of the individuals.

SUMMARY OF THE INVENTION

According to a first aspect of the present invention there is provided a method of approving expenditures in real-time, comprising using one or more processors for:
  Receiving an expenditure request initiated by a user associated with an organization for transaction of a value of funds of the organization in exchange for one or more products and/or services.
  Identifying one or more request attributes relating to one or more of: the user, the value, the funds, the product, the service, a time of reception of the expenditure request and/or a geographical location of the user.
  Analyzing scheduling data obtained from one or more online data sources. The scheduling data is indicative of one or more activity attributes of one or more activities scheduled for the user.
  Determining automatically compliance between the request attribute(s) and one or more expenditure rules predefined for the product(s) and/or service(s) with respect to the activity attribute(s).
  Transmitting a response to the expenditure request according to the determination which includes approval of the expenditure request in case of compliance and rejection in case of incompliance.

According to a second aspect of the present invention there is provided a system for approving expenditures in real-time, comprising one or more processors executing a code, the code comprising:
  Code instructions to receive an expenditure request initiated by a user associated with an organization for a transaction of a value of funds of the organization in exchange for one or more products and/or services.
  Code instructions to identify one or more request attributes relating to one or more of: the user, the value, the funds, the product, the service, a time of reception of the expenditure request and a geographical location of the user.
  Code instructions to analyze scheduling data obtained from one or more online data sources. The scheduling data is indicative of one or more activity attribute of one or more activities scheduled for the user.
  Code instructions to determine automatically compliance between the request attribute(s) and one or more expenditure rules predefined for the product(s) and/or service(s) with respect to the activity attribute(s).
  Code instructions to transmit a response to the expenditure request according to the determination which includes approval of the expenditure request in case of compliance and rejection in case of incompliance.

According to a third aspect of the present invention there is provided a method of approving expenditures in real-time, comprising using one or more processors for:
  Receiving an expenditure request initiated by a user associated with an organization for a transaction of a value of funds of the organization in exchange for one or more products and/or services.
  Identifying one or more request attributes relating to one or more of: the user, the value, the funds, the product, the service, a time of reception of the expenditure request and a geographical location of the user.
  Applying one or more trained machine learning models to the request attribute(s). The machine learning model(s) is trained to identify one or more approval patterns by analyzing a plurality of expenditure request evaluation sessions conducted by one or more authorized users of the organization for approving or rejecting respective expenditure requests received from one or more users associated with the organization.
  Transmitting a response to the expenditure request which includes approval or rejection of the expenditure request determined according to an outcome of machine learning model(s).

According to a fourth aspect of the present invention there is provided a system for approving expenditures in real-time, comprising one or more processors executing a code, the code comprising:
  Code instructions to receive an expenditure request initiated by a user associated with an organization for a transaction of a value of funds of the organization in exchange for one or more products and/or services.
  Code instructions to identify one or more request attributes relating to one or more of: the user, the value, the funds, the product, the service, a time of reception of the expenditure request and a geographical location of the user.

Code instructions to apply one or more trained machine learning models to the request attribute(s). The machine learning model(s) is trained to identify one or more approval patterns by analyzing a plurality of expenditure request evaluation sessions conducted by one or more authorized users of the organization for approving or rejecting respective expenditure requests received from one or more users associated with the organization.

Code instructions to transmit a response to the expenditure request which includes approval or rejection of the expenditure request determined according to an outcome of the machine learning model(s).

In a further implementation form of the first, second, third and/or fourth aspects, the transaction of the funds value includes an electronic card transaction, a cryptocurrency transaction and/or the like.

In a further implementation form of the first, second, third and/or fourth aspects, the request attributes relating to the user include: identity of the user, a relation of the user to the organization, an expense budget approved for the user, a rank of the user, a position of the user and a seniority of the user, a seniority of the user, a team the user belongs to, a department the user belongs to and/or the like.

In a further implementation form of the first, second, third and/or fourth aspects, the request attributes relating to the value include: the value, a maximal value per product, a maximal value per service and/or the like.

In a further implementation form of the first, second, third and/or fourth aspects, the request attributes relating to the funds include: a maximal value of organization funds available for expenditures, a maximal value of organization funds available for expenditures per period of time, a maximal value of funds available per user, a maximal value of funds available per product, a maximal value of funds available per service and/or the like.

In a further implementation form of the first, second, third and/or fourth aspects, the request attributes relating to the product(s) include: a type of the product, a category of a vendor of the product, an identity of the vendor and/or the like.

In a further implementation form of the first, second, third and/or fourth aspects, the request attributes relating to the service(s) include: a type of the service, a category of a vendor of the service, an identity of the vendor and/or the like.

In a further implementation form of the first and/or second aspects, the activity attributes include: a type of the activity, a time of the activity, a location of the activity, an authorization for the user to engage in the activity and/or the like.

In a further implementation form of the first and/or second aspects, the online data sources include: an electronic calendar, an electronic task list, an electronic itinerary, an email record, a text message record, a voice message record, an automated system of the organization and/or the like.

In a further implementation form of the first and/or second aspects, the expenditure rules include: a minimal value of funds available in an expense budget of the organization, a maximal funds value approved for a single expenditure, a maximal funds value approved for a plurality of expenditures, a maximal funds value approved per time period, authorization of purchase per product, a maximal funds value approved per product, authorization of purchase per service, a maximal funds value approved per service, a maximal funds value approved per activity, a maximal funds value approved for an event consisting of a plurality of activities, a maximal expense value approved for the user and/or the like.

In a further implementation form of the first and/or second aspects, the expenditure rules include: one or more rules specifically defined for the user and/or one or more general rules defined for a group of users associated with the organization.

In a further implementation form of the first and/or second aspects, one or more of the expenditure rules are defined by the organization according to one or more expense policy of the organization defining an expense policy for a user who is part of the organization, an expense policy for a sub-contractor and/or an expense policy for a customer.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DESCRIPTION OF SPECIFIC EMBODIMENTS OF THE INVENTION

The present invention, in some embodiments thereof, relates to approving expenditures, automatically in real-time, for users associated with an organization, and, more specifically, but not exclusively, to approving expenditures, in real-time, for users associated with an organization based on analysis of scheduling information indicative of activities scheduled for the user and compliance of the expenditures with predefined expenditure rules and/or learned approval patterns doe the identified scheduled activities.

According to some embodiments of the present invention, there are provided methods, systems and computer program products for automatically approving or rejecting, in real-time, expenditure (expense) requests initiated by users, for example, an employee, a sub-contractor, a customer and/or the like for transferring (transacting) funds in exchange for one or more products and/or services using payment means of an organization which may be private and/or a non-private.

The payment means used for the (monetary) funds transfer may include, for example, a digital card charge (e.g. credit card, debit card, etc.), a cryptocurrency transfer and/or the like. The expenditure requests may be therefore received from one or more monetary transaction systems, for example, a defrayal service, a cryptocurrency transfer system and/or the like configured to request approval for the funds transfer before actually committing the transfer.

Each expenditure request initiated by one of the users may be approved or rejected according to compliance of request attributes identified for the expenditure request with expenditure rules predefined for the organization with respect to the user, the product, the service, a time of the funds transfer, a geographical location of the funds transfer and/or the like. One or more of the expenditure rules may be individual rules directed and applicable for specific users associated with the organization. However, the expenditure rules may be general rules which are applicable for a group of users associated with the organization according to one or more user attributes of the users, for example, position, seniority, rank, team, department and/or the like.

The request attributes may be extracted from the expenditure request itself and/or may be identified by analyzing additional data obtained from one or more online data sources (e.g. finance, accounting, human resources, operations, customer management, etc.) associated with the organization, for example, an automated system of the organization, an online service of the organization and/or the like.

Moreover, the expenditure request may be approved or rejected with respect to one or more activities which the user is engaged in and for which he initiates the funds transfer, in particular, activities scheduled and potentially approved for the user in service of the organization, for example, a business trip, an organization event and/or the like. In order to identify the activity(s) scheduled and approved for the user, scheduling data relating to these activity(s) may be obtained (retrieved) from one or more of the online data sources which may further include devices, systems, application and/or systems associated with the user, for example, an electronic calendar, an electronic task list, an electronic itinerary, an email record, a text message record, a voice message record and/or the like. The scheduling information may be indicative of one or more activity attributes of the activity(s), for example, a type of the activity, a time of the activity, a geographical location of the activity and/or the like. The activity attributes may further include an authorization for the user to engage in the activity. Such authorization information may be extracted from one or more of the online data sources. For example, the authorization information may be identified by analyzing an email message originating from an authorized user to authorize the activity for the user. In another example, the authorization information may be identified based on analysis of an electronic calendar comprising the activity with an authorization indication form an authorized user.

The request attributes identified for the expenditure request may be analyzed with respect to the predefined expenditure rule(s) applicable for the expenditure request, available funds (e.g. budget plan and its utilization) and with relation to the activity attribute(s) identified for the user and the timeframe of the activity.

Based on the analysis, compliance or incompliance of the request attributes with the applicable expenditure rule(s) may be determined and an approval or rejection response may be transmitted accordingly to the monetary transaction system from which the expenditure request was received.

According to some embodiments of the present invention, there are provided methods, systems and computer program products for approving or rejecting one or more expenditure request based on an outcome from one or more trained machine learning models (algorithms), for example, a neural network, a Support Vector Machine (SVM) and/or the like. The machine learning model(s) is trained to identify one or more approval (and rejection) patterns of one or more authorized persons of the organization.

During one or more training sessions, in particular supervised training sessions, the machine learning model(s) may be trained using a plurality of training samples (datasets) comprising request attributes and labeled with "approve" or "reject" labels. The machine learning model(s) may analyze the labeled training samples to identify the approval pattern(s) and adjust its weights and propagation paths accordingly. The labeled training samples may be created, collected and/or labeled based on a plurality of expenditure request evaluation sessions conducted by one or more authorized persons for approving a plurality of expenditure requests.

During the approval process, the trained machine learning model(s) may be applied to the request attributes identified for the expenditure request received from the monetary transaction system. Based on an outcome from the trained machine learning model(s) an approval or rejection response may be transmitted to the originating monetary transaction system.

Automatically approving or rejecting the expenditure request initiated by the user associated with the organization for transferring funds using organization payment means may present significant advantages and benefits.

First, trusting the payment means in the hands (possession) of the user may expose vulnerability and damage for the organization since organization funds are at the discretion of the user who may deliberately and/or unintentionally make funds transfers which are not approved by authorized personnel of the organization. Therefore automatically analyzing the expenditure requests in real-time may significantly reduce the exposure of the organization to embezzlement and/or mistakenly initiated fund transfers.

Moreover, by associating the expenditure requests with activities scheduled for the user who initiates the expenditure request and which are potentially approved by the authorized personnel, the funds transfers may be correlated with purchase of product(s) and/or service(s) which are approved for purchase by the user for the scheduled and approved activity(s).

Furthermore, the expenditure rules which may be adapted and/or adjusted per user, per group of users, per product, per service, per geographical location and/or the like, the expenditure rules may form a highly flexible set of rules which may be suitable and applicable for a plurality of fund transfer situations, scenarios and incidents which may differ from each other in one or more of the request attributes.

In addition, using the machine learning models to identify the approval patterns of the authorized personnel may significantly reduce the effort, cost and/or complexity for adjusting and deploying a static expenditure rule set to adapt it to changing situations, conditions and/or realties which may affect the fund transfers and thus affect the request attributes. The machine learning models may constantly evolve using additional training samples and may therefore adapt to the changing conditions with minimal effort.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages.

The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
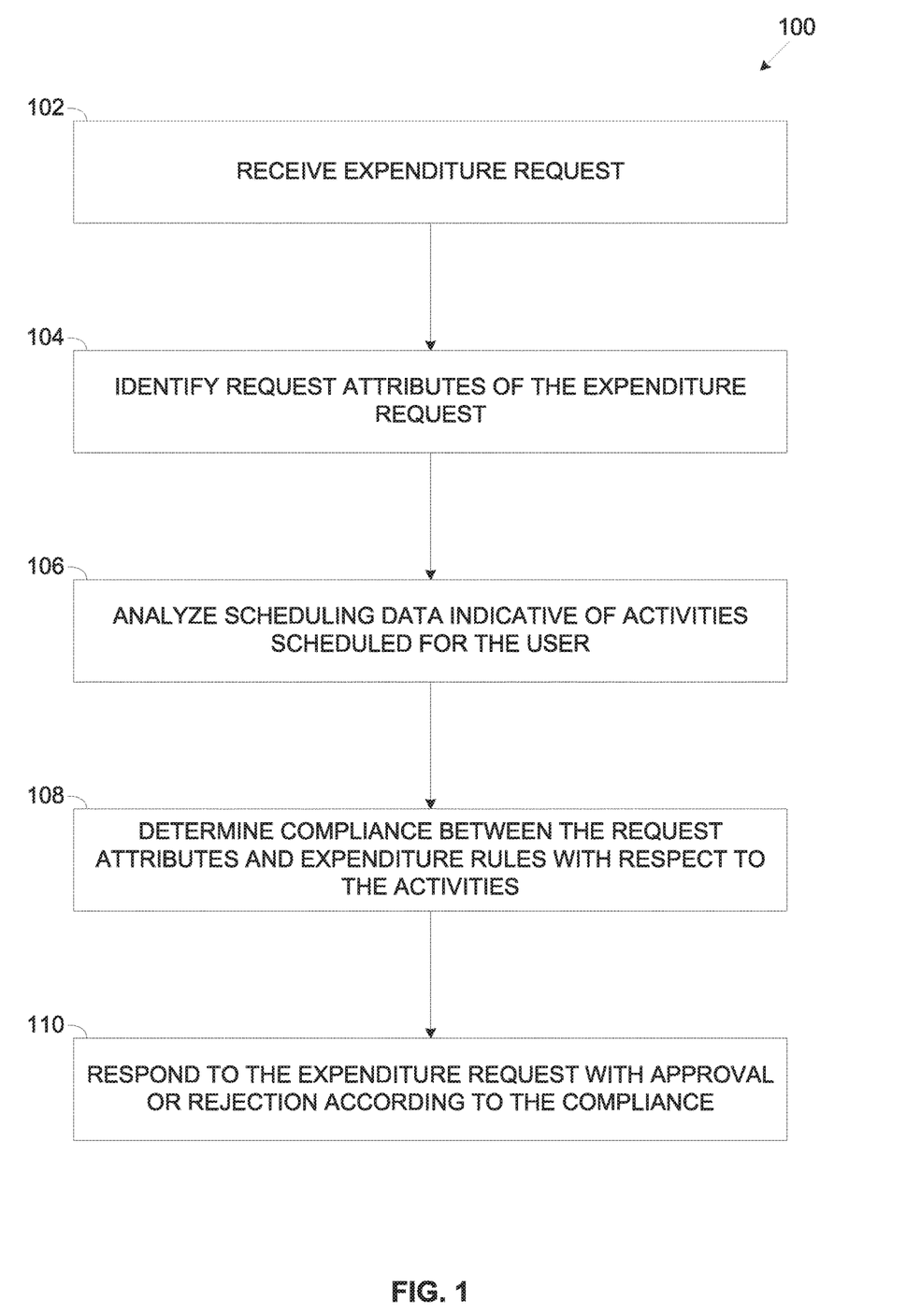
FIG. 1 is a flowchart of an exemplary process of approving an expenditure request initiated by a user according to compliance of the expenditure request with expenditure rules predefined for activities scheduled for the user, according to some embodiments of the present invention.

Referring now to the drawings, FIG. 1 is a flowchart of an exemplary process of approving or rejecting an expenditure request initiated by a user according to compliance of the expenditure request with expenditure rules predefined for activities scheduled for the user, according to some embodiments of the present invention. An exemplary process 100 may be executed to automatically approve or reject, in real-time, expenditure requests initiated by users associated with an organization for transferring (transacting) monetary funds, for example, a digital card charge (e.g. credit card, debit card, etc.), a cryptocurrency transfer and/or the like in exchange for one or more products and/or services. The expenditure requests may be received from one or more monetary transaction systems, for example, a defrayal service, a cryptocurrency transfer system and/or the like requesting approval for the funds transfer before actually committing the transfer.

One or more of the expenditure request may be approved or rejected according to compliance of one or more request attributes identified for the expenditure request with one or more expenditure rules predefined in an organization expense policy, in particular expenditure rule predefined for activities scheduled and approved for the user. The more request attributes may relate to the user, to the product(s) and or services for which the funds transaction (transfer) is requested, to a time of the request, to a geographical location of the user and and/or the like. These request attributes may be extracted from the expenditure request itself and/or may be identified by analyzing additional data obtained from one or more on-line data sources associated with the organization and/or with the user.

Moreover, scheduling data relating to one or more activities scheduled and optionally approved by one or more authorized persons in the organization may be obtained (retrieved) from one or more online data sources.

Based on compliance of the identified request attributed with the expenditure rules, the expenditure request may be approved or rejected and a response to the expenditure request may be sent to the monetary transaction system accordingly.

Figure 2:
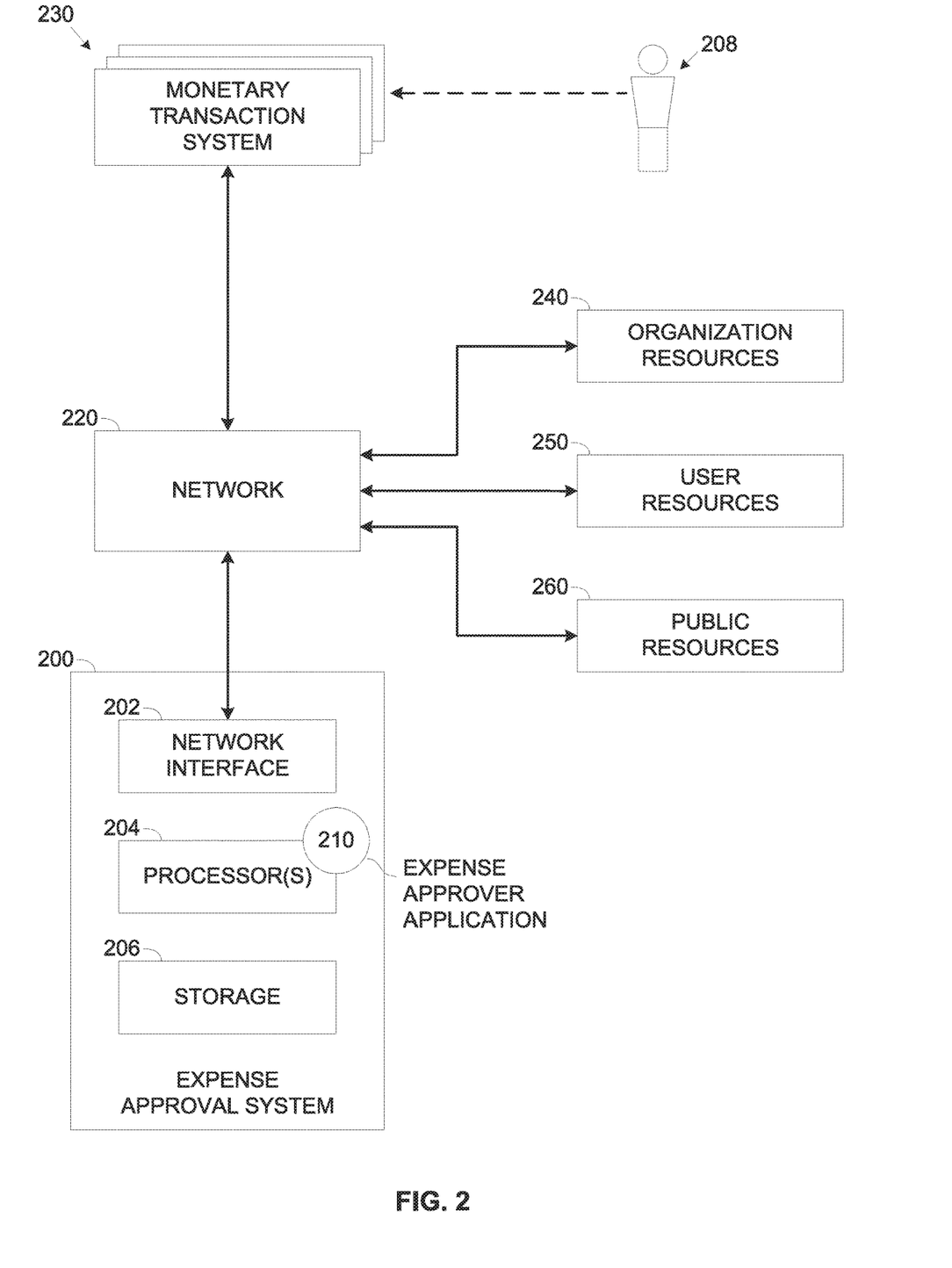
FIG. 2 is a schematic illustration of an exemplary system for approving an expenditure request initiated by a user according to compliance of the expenditure request with expenditure rules predefined for activities scheduled for the user, according to some embodiments of the present invention.

Reference is also made to FIG. 2, which is a schematic illustration of an exemplary system for approving an expenditure request initiated by a user according to compliance of the expenditure request with expenditure rules predefined for activities scheduled for the user, according to some embodiments of the present invention.

An exemplary expense approval system 200 may be used for executing a process such as the process 100 to approve or reject expenditure requests initiated by one or more users 208 associated with an organization, for example, an employee, a sub-contractor, an associate, a customer and/or the like for transacting (transferring) a value of me monetary funds in exchange for one or more products and/or services. The organization may be a private organization, for example, a company, an enterprise, a corporation, a firm and/or the like. However, the organization may be non-private organization, for example, a government organization, a state education institute, a state medical institute, a state defense and/or military agency and/or the like.

The expense approval system 200 may comprise a network interface 202 for connecting to a network 220, a processor(s) 204 for executing the process 100 and storage 206 for program and/or data storage.

The network interface 202 may include one or more wired and/or wireless interfaces for connecting to the network 220 which may comprise one or more wired and/or wireless networks, for example, a Local Area Network (LAN), a Wide Area Network (WAN), a Metropolitan Area Network (MAN), a cellular network, the internet and/or the like to facilitate communication with one or more remote network resources connected to the network 220.

The expense approval system 200 may communicate over the network 220 with one or more monetary transaction systems 230 configured to request approval for funds transactions prior to actually making and committing the transaction. Such monetary transaction systems 230 may include, for example, a digital card defrayal system, a cryptocurrency blockchain network and/or the like.

The expense approval system 200 may also communicate over the network 220 with one or more online data sources connected to the network 220.

The online remote systems may include one or more organization resources 240 associated with the organization, for example, a computer, a server, a processing node, a cluster of processing nodes, a service, a cloud service and/or the like to obtain organization information in particular with respect to funds availability and user information for the user 208. The organization resources and/or services 240 may include, for example, a storage system and/or service storing organization data, an electronic mail system (server), an automated operations system and/or service, an automated finance and/or accounting system and/or service, an automated Human Resource (HR) system and/or service, an automated Customer Relations Management (CRM) system and/or service, an automated projects management system and/or service and/or the like. The organization resources and/or services 240 may further include one or more logging and/or analytics systems, services and/or engines configured to log, record and organize information of the organization, in particular, information relating to expenditure, requests, monetary transaction, events attended by a plurality of users 208 associated with the organization, activities engaged by the users 208 and/or the like.

The online remote systems may include one or more remote user resources 250, for example, a device, a system and/or a service associated with the user 208, for example, a computer, a mobile device, a mobile phone, an account in a networked service (e.g. web based, cloud based) and/or the like.

The online remote systems may optionally include one or more online public resources 260, for example, a system and/or a service to query, obtain and/or collect general information relating to one or more aspects of the expenditure requests received from the monetary transaction systems 230. Such public resources and/or services 260 may include, for example, online information services, digital marketplaces and/or the like serving to provide general information such as, for example, products and/or services cost, currency exchange rates, weather information and/or the like.

The processor(s) 204, homogenous or heterogeneous, may include one or more processors arranged for parallel processing, as clusters and/or as one or more multi core processor(s). The storage 206 may include one or more non-transitory persistent storage devices, for example, a hard drive, a Flash array and/or the like. The storage 206 may also include one or more volatile devices, for example, a Random Access Memory (RAM) component and/or the like. The storage 206 may further comprise one or more local and/or remote network storage resources, for example, a storage server, a Network Attached Storage (NAS), a network drive, and/or the like accessible via one or more networks through the network interface 202.

The processor(s) 204 may execute one or more software modules such as, for example, a process, a script, an application, an agent, a utility, a tool, an operating system and/or the like each comprising a plurality of program instructions stored in a non-transitory medium (program store) such as the storage 206 and executed by one or more processors such as the processor(s) 204. For example, the processor(s) 204 may execute an expense approver application 210 to execute the process 100 for approving and/or rejecting received expenditure requests.

Optionally, the expense approval system 200 and/or the expense approver 210 are provided by one or more cloud computing services, for example, Infrastructure as a Service (IaaS), Platform as a Service (PaaS), Software as a Service (SaaS) and/or the like provided by one or more cloud infrastructures and/or services such as, for example, Amazon Web Service (AWS), Google Cloud, Microsoft Azure and/or the like.

As shown at 102, the process 100 starts with the expense approver 210 receiving an expenditure request from one of the monetary transaction systems 230. The expenditure request may be initiated by the user 208 to make a transaction of a certain value of funds of the organization in exchange for one or more products and/o services.

The products and services may include a wide range of product types, categories and/or classes which one or more users such as the user 208 associated with the organization may purchase in service of the organization. For example, the products and services may include products and services purchased during a business trip of the user 208 in service of the organization. In another example, the products and services may include products and services purchased by the user 208 for an event held by the organization, on behalf of the organization and/or in relation with the organization, for example, a board meeting, a marketing exhibition, a customer visit hosting and/or the like.

To enable the user 208 to purchase such products and/or services in service of the organization, the user 208 may be allocated (given) with expense funds (budget) which may be facilitated in one or more payments means. For example, the user 208 may be given a digital card of the organization, for example, a credit card, a debit card and/or the like for making money transactions from an account of the organization associated with the digital card. In another example, the user 208 may be allocated with a cryptocurrency account of the organization for making cryptocurrency transactions from the organization's cryptocurrency account.

The expenditure request may be therefore received from one or more of the monetary transaction systems 230, specifically according to the payment means allocated to the user 208. For example, assuming the user 208 uses the digital card to make a money transaction from the organization's account to an account of a vendor of the product(s) and/or service(s). In such case the monetary transaction systems 230, for example, a credit card company defrayal system which receives the money transaction request may issue the expenditure request to the expense approver 210. In another example, assuming the user 208 uses the organization's cryptocurrency account to make a cryptocurrency transaction from the organization's cryptocurrency account to a cryptocurrency account of the vendor of the product(s) and/or service(s). In such case the monetary transaction systems 230, for example, a cryptocurrency system, a cryptocurrency blockchain network and/or the like may issue the expenditure request to the expense approver 210.

As shown at 104, the expense approver 210 may identify one or more request attributes relating to the received expenditure request, in particular, request attributes relating to the user 208, the value of the funds transaction (transfer), the funds of the organization, the product(s), the service(s), a time of reception of the expenditure request, a geographical location of the user 208 and/or the like.

The expense approver 210 may extract one or more of the request attributes from the received expenditure request which may include at least some these request attributes, for example, an identifier (e.g. card number) of the digital card, an identifier of the cryptocurrency account (e.g. account public key), a time of issue of the expenditure request, the transaction value, the product type, the product name, the service type, the service name, a category of the vendor, an identity of the vendor and/or the like.

However, the expense approver 210 may further access one or more of the remote resources, in particular the organization resources 240 to identify and determine one or more of the request attributes which may not be directly extracted, derived and/or inferred from the expenditure request itself.

For example, the expense approver 210 may access the organization resource(s) 240, for example, one or more financial systems and/or services of the organization to identify one or more request attributes relating to the user 208, for example, an identity (identifier) of the user 208 which is currently allocated with (possessing) the digital card and/or the cryptocurrency account, an overall expense budget approved for the user 208 in particular with respect to one or more activities the user 208 attends and/or conducts, a periodic expense budget approved for the user 208 and/or the like.

Communicating with one or more of the organization resources 240, for example, the financial system and/or service, the expense approver 210 may identify one or more request attributes relating to the funds of the organization, for example, funds availability and/or the like. For example, the expense approver 210 may identify a maximal value of organization funds available for expenditures, a maximal value of organization funds available for expenditures per period of time, a maximal value of funds available per user, a maximal value of funds available per product, a maximal value of funds available per service and/or the like.

In another example, the expense approver 210 may further access one or more of the organization resources 240, for example, an information storage systems, an HR system and/or the like to obtain further information on the user based on the identity (identifier) of the user 208, for example, a relation of the user 208 to the organization (e.g. employee, associate, sub-contractor, customer, etc.), a rank of the user 208, a position of the user 208, a seniority of the user 208, a team the user 208 belongs to, a department the user 208 belongs to and/or the like.

The expense approver 210 may also communicate with one or more of the public resources 260 to obtain market values, i.e. prices and/or costs for the identified product(s) and/or service(s) for which the funds transaction is requested. For example, assuming the user 208 currently on a travel trip initiates the funds transaction to purchase a flight ticket to a certain destination, the expense approver 210 may access one or more online services and/or applications, for example, an airline site, a travel agency site, a travel platform and/or the like to obtain current price of such a flight ticket, for example, an average price, a maximal price and/or the like. In another example, assuming the user 208 currently on a travel trip initiates the funds transaction to pay for accommodation, for example, a hotel room at a certain geographical region, the expense approver 210 may access one or more online services and/or applications, for example, a hotel site, a travel agency site, a consumer service and/or the like to obtain current price of such a room, for example, an average price, a maximal price and/or the like. In another example, assuming the user 208 currently on a travel trip initiates the funds transaction to purchase a cellular communication package (service) at a certain geographical region, the expense approver 210 may access one or more online services and/or applications, for example, a cellular service provider site, a consumer service and/or the like to obtain current price of such a cellular communication package, for example, an average price, a maximal price and/or the like.

As shown at 106, the expense approver 210 may access one or more of the organization resources 240 and/or the user resources 250 to obtain scheduling data relating to the user 208, for example, events, activities and/or the like scheduled, appointed and/or assigned to the user 208. The scheduling data includes and/or indicates one or more activity attributes of one or more activities scheduled for the user 208, for example, an activity type, a time of the activity, a location of the activity, additional participants (external, clients etc.) and/or the like. The scheduling data may further include and/or indicate one or more activity attributes of a set of activities the user 208 is planned to engage as part an event, business trip and/or the like scheduled for the user 208. The expense approver 210 may analyze the scheduling data to identify the activity attribute(s) of one or more activities and/or events scheduled for the user 208 at the current time, i.e. at the time of receiving the expenditure request initiated by the user 208.

The user resources 250 accessed by the expense approver 210 to obtain the scheduling data may include devices, systems and/or services associated with the user 208, for example, a computer, a mobile device, a mobile phone, a networked service (e.g. platform, application, etc.), a cloud service and/or the like. In particular, the user resources 250 may include one or more applications and/or services associated with the user 208 and executed or provided by the above mentioned devices, systems and/or services, for example, an electronic calendar, an electronic task list, an electronic itinerary, an email record, a text message record, a voice message record, an account in the networked service (e.g. web based, cloud based) and/or the like. For example, the expense approver 210 may analyze data obtained from the electronic calendar of the user 208 to identify the activity attribute(s) of one or more activities and/or events scheduled for the user 208 at the current time. In another example, the expense approver 210 may analyze data obtained from the electronic mail record of the user 208 to identify correspondence indicative of the activity attribute(s) of one or more activities and/or events scheduled for the user 208 at the current time. In another example, the expense approver 210 may analyze data obtained from an account of the user 208 in an online networked task list service to identify the activity attribute(s) of one or more activities and/or events scheduled for the user 208 at the current time.

The expense approver 210 may also analyze scheduling data relating to the user 208 that is obtained from one or more of the organization resources 240. For example, the expense approver 210 may analyze status information indicative of the activity attribute(s) of one or more tasks, assignments and/or the like assigned and/or scheduled for the user 208 for the current time which is obtained from the HR system of the organization. In another example, the expense approver 210 may analyze data obtained from the electronic mail record of one or more other users 208 associated with the organization to identify correspondence indicative of the activity attribute(s) of one or more activities and/or events scheduled for the user 208 at the current time.

The activity attributes may further include authorization by one or more authorized persons associated with the organization for one or more of the activity(s) identified by the expense approver 210 based on the analysis of the scheduling data. For example, the expense approver 210 may analyze data obtained from the electronic calendar of the user 208 to determine whether an identified activity is approved by one or more of the authorized persons. In another example, the expense approver 210 may analyze data obtained from the electronic mail record of the user 208 to identify correspondence from one or more of the authorized persons indicative of authorization of one or more activities and/or events scheduled for the user 208 at the current time.

As shown at 108, the expense approver 210 may determine compliance of the request attribute(s) identified for the received expenditure request with one or more expenditure rules predefined by one or more policies of the organization for the product(s) and/or the service(s) for which the funds transaction and hence the expenditure request is initiated. Specifically, the expense approver 210 determines compliance of the request attribute(s) of the expenditure request with the expenditure rule(s) with respect to the activity attribute(s) identified for the activity(s) scheduled for the user 208 at the current time, i.e. the time of reception of the expenditure request. The expense approver 210 may communicate with one or more of the organization resources 240 to obtain the expenditure rules which may be predefined for one or more of the users 208 associated with the organization in one or more expense policies of the organization comprising.

The expenditure rules predefined for the products and/or service may include, for example, a minimal value of funds available in an expense budget of the organization, a maximal funds value approved for a single expenditure, a maximal funds value approved for a plurality of expenditures, a maximal funds value approved per time period, authorization of purchase per product, a maximal funds value approved per product, authorization of purchase per service, a maximal funds value approved per service, a maximal funds value approved per activity, a maximal funds value approved for an event consisting of a plurality of activities, a maximal expense value approved for the user and/or the like.

The expenditure rules may include one or more individual (personal) expenditure rules specifically defined for one or more specific users 208 associated with the organization. As such, different expenditure rule may be defined for different users 208. For example, a first expenditure rule predefined for a first user 208 may define the maximal funds value approved for the first user 208 per time period (e.g. day) is X while a second expenditure rule predefined for a second user 208 may define the maximal funds value approved for the second per the same time period is 3X.

However, the expenditure rules may further include one or more general expenditure rules defined for a group of users 208 associated with the organization. For example, an expense policy defining one or more general expenditure rules may be created for users 208 who are part of the organization, for example, an owner, an employee and/or the like. Such expenditure rules may therefore define general. In another example, another expense policy defining one or more general expenditure rules may be created for users 208 who are sub-contractors and/or service providers of the organization, for example, a supplier, an accounting firm, a legal firm and/or the like. In another example, another expense policy defining one or more expenditure rules may be created for users 208 who customers of the organization.

The general expenditure rules may be predefined and correlated with one or more user attributes common to a group of users 208. For example, a certain expenditure rule may be predefined for one or more certain groups of user 208, for example, according to the position (e.g. manager, director, engineer, technician, secretary, etc.) of the users 208 in the organization. In another example, a certain expenditure rule may be predefined for one or more certain groups of user 208, for example, according to the seniority of the users 208.

One or more of the expenditure rules may be also defined with respect to geographical locations. For example, a plurality of expenditure rules may be predefined for accommodation in a plurality of geographical locations where a different maximal funds value is approved for the accommodation. Similarly, one or more of the expenditure rules may be defined with respect to time. For example, a plurality of expenditure rules may be predefined for rental cars during different times of the week and/or the year since rental cars prices may vary greatly between different days of the week (e.g. week day vs. weekend), different times of the year (e.g. summer vs. winter, holidays, etc.) and/or the like.

Optionally, one or more of the expenditure rules may be defined with respect to a current price and/or cost of one or more products and/or services. Such expenditure rules may dictate accessing one or more of the organization resources 240 and/or one or more of the public resources to obtain the actual market prices (e.g. average, maximal, etc.) for one or more of the products and/or services optionally with respect to the time and geographical region.

The expense approver 210 may therefore identify one or more and optionally all expenditure rules applicable for the identified request attribute(s) relating to the user 208, to the product(s) and or services for which the funds transaction (transfer) is requested, to the time of the request, to the geographical location of the user 208 and and/or the like.

The expense approver 210 may analyze the identified request attribute(s) compared to the applicable expenditure rule(s), in particular with respect to the activity(s) scheduled for the user 208 and more particularly with respect to activity attribute(s) of scheduled activity(s) which are approved for the user 208 by one or more of the authorized persons of the organization.

For example, the expense approver 210 may determine that a certain activity, for example, a car rental (request attribute) at a certain geographical area (request attribute) is incompliant with applicable expenditure rule(s) in case the user 208 (request attribute) is not authorized (activity attribute) to be at the certain geographical area (activity attribute) at the current time (activity attribute).

In another example, assuming the expenditure request is initiated by a certain user 208 for transferring a certain funds value for purchasing a flight ticket (request attribute) in a business class (request attribute) of a certain airline company (request attribute). Assuming the user 208 is authorized (activity attribute) to engage in the activity (flying), the expense approver 210 may determine, based on the identity of the certain user 208 (request attribute) that the request features are incompliant with applicable expenditure rule(s) in case the respective expenditure rule(s) indicates that the certain user 208 is not authorized to fly in business class.

In another example, assuming the expenditure request is initiated by the user 208 for transferring a certain funds value for purchasing a flight ticket (request attribute) at a certain price (request attribute). Assuming the user 208 is authorized (activity attribute) to engage in the activity (flying), the expense approver 210 may determine that the request features are incompliant with applicable expenditure rule(s) defining a lower maximal price than the certain price. On the other hand, Assuming the user 208 is authorized (activity attribute) to engage in the activity (flying), the expense approver 210 may determine, based on the identity of the certain user 208 (request attribute) that the request features comply with respective expenditure rule(s) defining a higher maximal price than the certain price.

In another example, assuming the expenditure request is initiated by the user 208 for transferring a certain funds value for purchasing a certain product (request attribute) during a certain authorized activity (activity attribute). Further assuming an applicable expenditure rule(s) defines a certain maximal approved funds value per time period (e.g. day) for the user 208 (request attribute). In such case, the expense approver 210 may determine that the request features are incompliant with the applicable expenditure rule(s) in case the certain funds value exceeds the certain per period maximal approved funds value or a reminder of the certain per period maximal approved funds value (after deducting previous funds transaction during the same time period). However, the expense approver 210 may determine that the request features are compliant with the applicable expenditure rule(s) in case the certain funds value do not exceeds the certain per period maximal approved funds value or the reminder of the certain per period maximal approved funds value.

As shown at 110, the expense approver 210 may respond to the monetary transaction systems 230 from which the expenditure request is received according to the compliance or incompliance determination. In particular, in case the request attribute(s) comply with the applicable expenditure rule(s) with respect to the activity attribute(s), the expense approver 210 may transmit an approval response to the monetary transaction systems 230 indicating the monetary transaction systems 230 to process the funds transaction. However, in case the request attribute(s) do not comply with the applicable expenditure rule(s) with respect to the activity attribute(s), the expense approver 210 may transmit a rejection response to the monetary transaction systems 230 indicating the monetary transaction systems 230 to avoid processing the funds transaction.

According to some embodiments of the present invention, the expense approver 210 may be applied to allocate funds (budget) in advance for one or more of the user 208 according to one or more of the expenditure rules and with respect to one or more of activities scheduled for the user(s) 208. For example, the expense approver 210 may identify that a certain user 208 is scheduled to go on a business trip in service of the organization to a certain geographical region for a certain period of time at some future time. The expense approver 210 may analyze the activity attributes of one or more activities the user 208 is expected to engage in during the business trip and may estimate one or more products and/or services the user 208 may purchase during these activity(s). The expense approver 210 may therefore allocate funds for the user 208 according to one or more of the expenditure rules applicable for the product, for the service, for the user 208, for the geographical region, for the time of travel, for the trip duration and/or the like. The expense approver 210 may further adjust the allocated funds according to current and/or predicted prices and/or costs of the products and/or services estimated to be purchased by the user 208 during the business trip. The expense approver 210 may obtain the current and/or predicted prices and/or costs of the products and/or services based on information obtained from one or more of the organization resources 240 and/or the public resources 260.

According to some embodiments of the present invention, the expense approver 210 may approve or reject one or more expenditure requests based on an outcome from one or more trained machine learning models (algorithms), for example, a neural network, an SVM and/or the like trained to identify one or more approval patterns of one or more authorized persons of the organization. The trained machine learning model(s) may be applied to the request attributes identified for the expenditure requests and may output approve or reject outcome according to the identified approval pattern(s). The machine learning model(s) may be trained using supervised learning in which the machine learning model(s) analyzes a plurality of training samples comprising values of the request attributes where each of the training samples is labeled with an approve label or a reject label. The labeled training samples may be created, collected and/or labeled based on a plurality of expenditure request evaluation sessions conducted by one or more of the authorized persons who are authorized to approve or reject expenditure requests.

Figure 3:
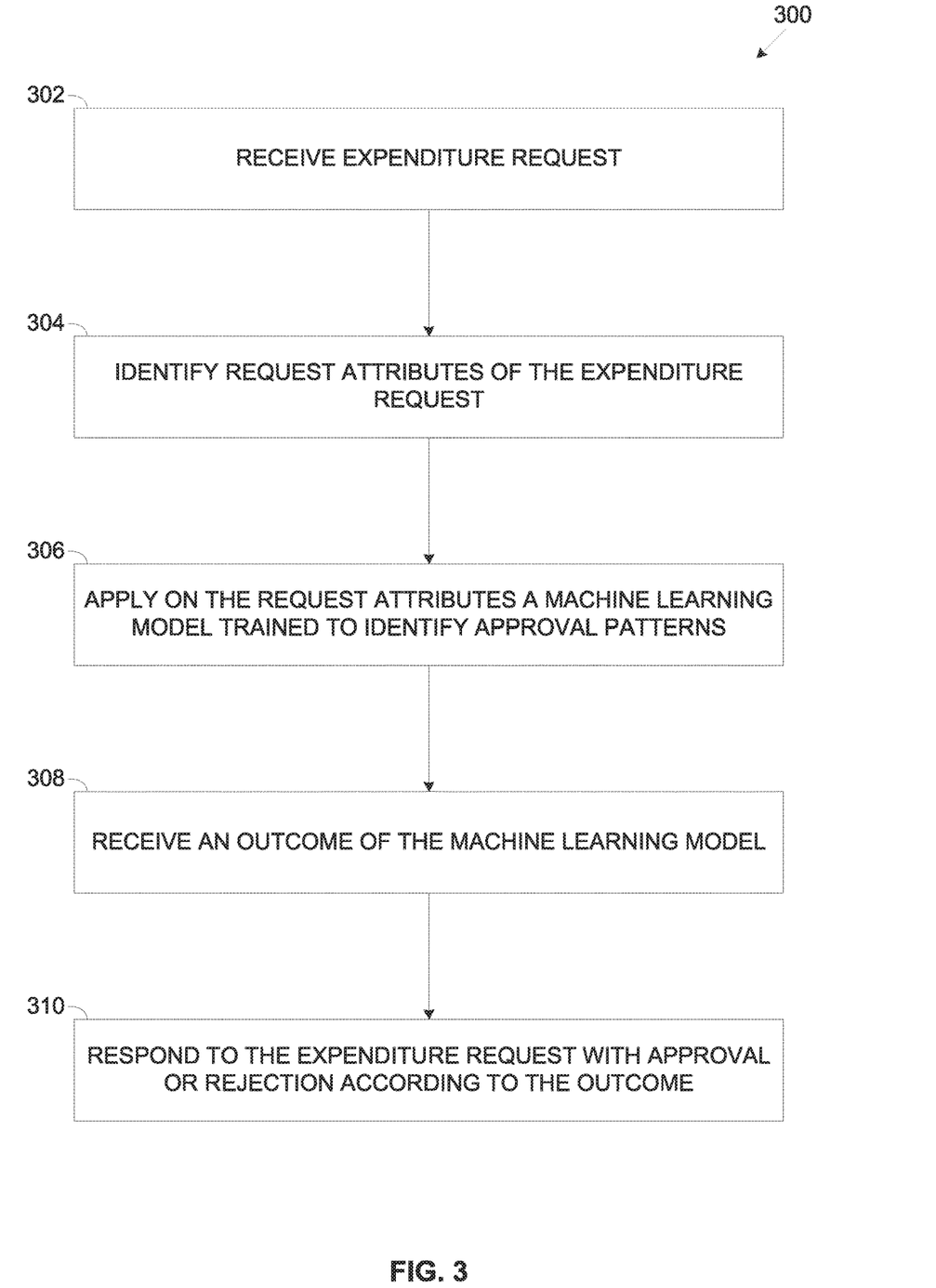
FIG. 3 is a flowchart of an exemplary process of approving an expenditure request initiated by a user using a machine learning model trained to identify approval and rejection patterns based on analysis of a plurality of authorization sessions conducted by authorized users, according to some embodiments of the present invention.

Reference is now made FIG. 3, which is a flowchart of an exemplary process of approving an expenditure request initiated by a user using a machine learning model trained to identify approval and rejection patterns based on analysis of a plurality of authorization sessions conducted by authorized users, according to some embodiments of the present invention. an exemplary process 300 may be executed by an expense approver such as the expense approver 210 executed by an expense approval system such as the expense approval system 200 for approving or rejecting in real-time one or more expenditure requests initiated by a user such as the user 208 for transacting (transferring) funds in exchange for one or more products and/or services.

As shown at 302, the process 300 starts with the expense approver 210 receiving an expenditure request from a monetary transaction system such as the monetary transaction systems 230 as described in step 102 of the process 100.

As shown at 304, expense approver 210 may identify one or more of the request attributes relating to the received expenditure request. The expense approver 210 may extract one or more of the request attributes from the expenditure request while identifying other expenditure request by analyzing data obtained from one or more organization resources such as the organization resources 240, one or more user resources such as the user resources 250 and/or one or more public resources such as the public resources 260 as described in step 104 of the process 100.

As shown at 306, the expense approver 210 may apply to the to the request attributes identified for the expenditure request one or more trained machine learning models, for example, a neural network, an SVM and/or the like.

The machine learning model(s) may be trained in one or more supervised training sessions using labeled training samples (datasets). Each of the training samples corresponds to a respective one of a plurality of expenditure requests and thus comprises values for one or more of the request attributes and is labeled with an "approve" label or a "reject" label. The machine learning model(s) analyzes the labeled training samples and evolves by adjusting its weights and propagation paths to identify one or more approval patterns (which may also include rejection patterns) for at least some of the plurality of expenditure requests. Based on the approval patterns, the machine learning model(s) may produce, for each training sample, an outcome matching the label of the respective training sample.

The labeled training samples may be created, collected and/or labeled based on a plurality of expenditure request evaluation sessions conducted by one or more of the authorized persons who are authorized to approve or reject expenditure requests. During each of the expenditure request evaluation sessions, the authorized person may evaluate a respective expenditure request initiated by one of the users 208 and decide whether to approve the funds transaction or reject it.

The data of the expenditure request evaluation sessions may be logged, recorded and/or organized in one or more of the organization resources 240, for example, the storage system, the analytics system and/or the like. For each expenditure request evaluation session, a dataset comprising the request attributes identified for the respective expenditure request may be logged, in particular in correlation with the decision of the authorized user to approve or reject the respective expenditure request. The labeled training samples may be then created based using the stored datasets created for the expenditure request evaluation sessions.

The trained machine learning model(s) may be applied to one or more new (unseen) datasets comprising one or more of the request attributes to estimate the label of each new (unseen) dataset with a certain probability score indicating an estimated probability of correctness of the label.

The expense approver 210 may therefore apply the trained machine learning model(s) to the request attribute(s) identified for the expenditure request to estimate and output the label ("approve" or "reject") having the highest probability score based on the approval pattern(s) identified during training.

As shown at 308, the expense approver 210 may receive the outcome of the trained machine learning model(s) for the request attribute(s) identified for the expenditure request optionally with the probability score.

As shown at 310, the expense approver 210 may respond to the monetary transaction systems 230 from which the expenditure request is received according to the outcome from the trained machine learning model(s). For example, in case the outcome from the trained machine learning model(s) includes the "approve" label with a probability score exceeding a certain threshold value, the expense approver 210 may transmit an approval response to the monetary transaction systems 230 indicating the monetary transaction systems 230 to process the funds transaction. In case the outcome from the trained machine learning model(s) includes the "reject" label with a probability score exceeding a certain threshold value, the expense approver 210 may transmit a rejection response to the monetary transaction systems 230 indicating the monetary transaction systems 230 to avoid processing the funds transaction.

It is expected that during the life of a patent maturing from this application many relevant systems, methods and computer programs will be developed and the scope of the term machine learning model is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

The word "exemplary" is used herein to mean "serving as an example, an instance or an illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A computer program product comprising a non-transitory medium storing thereon computer program instructions which, when executed by a hardware processor, cause the hardware processor to:

receive through a communication network an expenditure request to conduct a transaction of a value of funds of the organization in exchange for at least one product and/or service, said expenditure request is initiated by a user associated with an organization and requesting an approval to purchase said at least one product and/or service prior to conducting and committing said transaction;

process said expenditure request to extract a plurality of request attributes including attributes relating to at least the user, the value, the funds, the product and/or service, a time of reception of the expenditure request and a geographical location of the user;

according to an expenditure rule related to the product and/or service, access over said communication network at least one on-line public data source to obtain market data related to the product and/or service;

access through said communication network, at least one of at least one on-line data source associated with the organization and at least one on-line data source associated with the user, to extract scheduling data indicative of at least one activity attribute of at least one activity scheduled for the user;

analyze said scheduling data to obtain said at least one activity attribute of the at least one activity scheduled for the user;

determine when the plurality of request attributes comply with the at least one expenditure rule related to the product and/or service with respect to the obtained at least one activity attribute, said at least one expenditure rule is defined for activities scheduled and approved for the user; and transmit a response to the expenditure request according to the determination which includes approval of the expenditure request in case of compliance and rejection in case of incompliance;

wherein the at least one activity attribute includes at least one member of a group consisting of: a type of the activity, a time of the activity, a location of the activity and an authorization for the user to engage in the activity.

2. The computer program product of claim 1, wherein the transaction of the funds value includes at least one of: an electronic card transaction and a cryptocurrency transaction.

3. The computer program product of claim 1, wherein the at least one request attribute relating to the user includes at least one member of a group consisting of: identity of the user, a relation of the user to the organization, an expense budget approved for the user, a rank of the user, a position of the user and a seniority of the user, a seniority of the user, a team the user belongs to and a department the user belongs to.

4. The computer program product of claim 1, wherein the at least one request attribute relating to the value includes at least one member of a group consisting of: the value, a maximal value per product and a maximal value per service.

5. The computer program product of claim 1, wherein the at least one request attribute relating to the funds includes at least one member of a group consisting of: a maximal value of organization funds available for expenditures, a maximal value of organization funds available for expenditures per period of time, a maximal value of funds available per user, a maximal value of funds available per product and a maximal value of funds available per service.

6. The computer program product of claim 1, wherein the at least one request attribute relating to the at least one product includes at least one member of a group consisting of: a type of the product, a category of a vendor of the product and an identity of the vendor.

7. The computer program product of claim 1, wherein the at least one request attribute relating to the at least one service includes at least one member of a group consisting of: a type of the service, a category of a vendor of the service and an identity of the vendor.

8. The computer program product of claim 1, wherein the online data source is a member of a group consisting of: an electronic calendar, an electronic task list, an electronic itinerary, an email record, a text message record, a voice message record, an automated system of the organization and an online service of the organization.

9. The computer program product of claim 1, wherein the at least one expenditure rule includes at least one member of a group consisting of: a minimal value of funds available in an expense budget of the organization, a maximal funds value approved for a single expenditure, a maximal funds value approved for a plurality of expenditures, a maximal funds value approved per time period, authorization of purchase per product, a maximal funds value approved per product, authorization of purchase per service, a maximal funds value approved per service, a maximal funds value approved per activity, a maximal funds value approved for an event consisting of a plurality of activities and a maximal expense value approved for the user.

10. The computer program product of claim 1, wherein the at least one expenditure rule includes at least one member of a group consisting of: a rule specifically defined for the user and a general rule defined for a group of users associated with the organization.

11. The computer program product of claim 1, wherein the at least one expenditure rule is defined by the organization according to at least one expense policy of the organization defining at least one member of a group consisting of: an expense policy for a user who is part of the organization, an expense policy for a sub-contractor and an expense policy for a customer.

* * * * *